(12) United States Patent
Rowe

(10) Patent No.: US 7,207,057 B1
(45) Date of Patent: Apr. 17, 2007

(54) SYSTEM AND METHOD FOR COLLABORATIVE, PEER-TO-PEER CREATION, MANAGEMENT & SYNCHRONOUS, MULTI-PLATFORM DISTRIBUTION OF PROFILE-SPECIFIED MEDIA OBJECTS

(76) Inventor: Lynn T. Rowe, 2121 N. Ocean Blvd., Apt. 209W, Boca Raton, FL (US) 33421

( * ) Notice: Subject to any disclaimer, the term of this patent is extended or adjusted under 35 U.S.C. 154(b) by 1008 days.

(21) Appl. No.: 09/987,943

(22) Filed: Nov. 16, 2001

Related U.S. Application Data

(60) Provisional application No. 60/248,558, filed on Nov. 16, 2000.

(51) Int. Cl.
*H04N 7/16* (2006.01)

(52) U.S. Cl. ............... 725/144; 725/146
(58) Field of Classification Search .......... 725/91, 725/114, 144, 146
See application file for complete search history.

(56) References Cited

U.S. PATENT DOCUMENTS

| | | | | |
|---|---|---|---|---|
| 5,587,734 A * | 12/1996 | Lauder et al. | .......... | 725/139 |
| 5,832,222 A * | 11/1998 | Dziadosz et al. | .......... | 709/216 |
| 6,052,780 A * | 4/2000 | Glover | .......... | 713/193 |
| 6,405,284 B1 * | 6/2002 | Bridge | .......... | 711/114 |
| 6,426,778 B1 * | 7/2002 | Valdez, Jr. | .......... | 348/461 |
| 6,477,707 B1 * | 11/2002 | King et al. | .......... | 725/97 |
| 6,535,815 B2 * | 3/2003 | Bloebaum | .......... | 701/213 |
| 6,792,615 B1 * | 9/2004 | Rowe et al. | .......... | 725/37 |
| 6,810,413 B1 * | 10/2004 | Rajakarunanayake et al. | .......... | 709/203 |
| 2002/0087416 A1 * | 7/2002 | Knutson | .......... | 705/23 |
| 2002/0188943 A1 * | 12/2002 | Freeman et al. | .......... | 725/38 |
| 2003/0074443 A1 * | 4/2003 | Melaku et al. | .......... | 709/224 |
| 2004/0117831 A1 * | 6/2004 | Ellis et al. | .......... | 725/53 |
| 2004/0153526 A1 * | 8/2004 | Haun et al. | .......... | 709/217 |
| 2005/0086687 A1 * | 4/2005 | Omoigui | .......... | 725/35 |
| 2006/0069724 A1 * | 3/2006 | Langdon | .......... | 709/203 |

* cited by examiner

*Primary Examiner*—Chris Kelley
*Assistant Examiner*—Farzana E. Hossain
(74) *Attorney, Agent, or Firm*—Pillsbury Winthrop Shaw Pittman, LLP

(57) ABSTRACT

In a television programming management system, contributors access television programming functionality of legacy systems using a web-based interface provided by a network operations center. The network operations center is a best-of-breed J2EE-based implementation that provides a middleware interface to legacy systems. Using the interface provided by the network operations center, contributors can access any functionality required to create and distribute television programming. The present invention provides security features though a classifier. Use of playlists allows synchronization of created objects. Television programming can be performed by users and contributors.

10 Claims, 18 Drawing Sheets

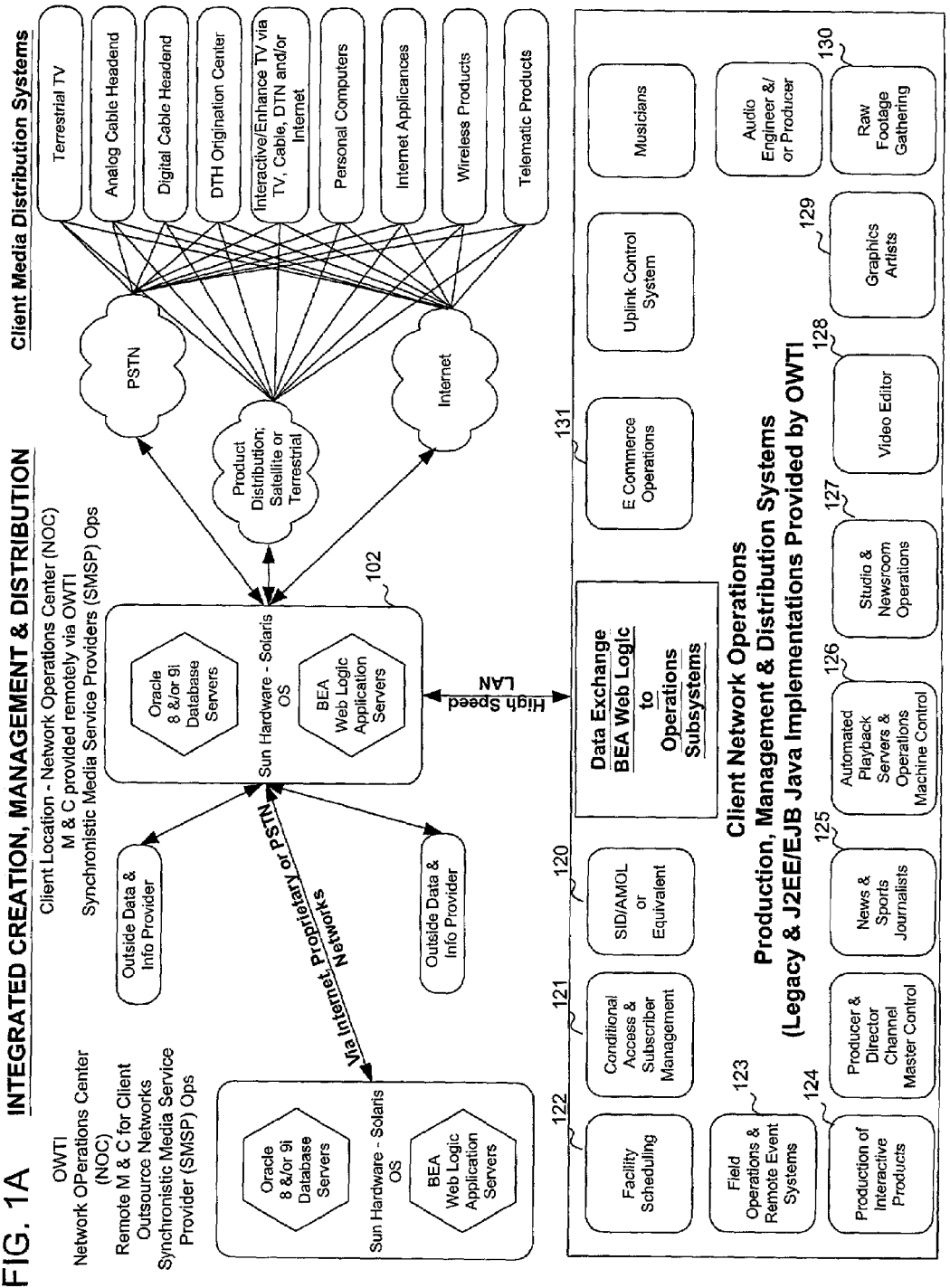
FIG. 1A  INTEGRATED CREATION, MANAGEMENT & DISTRIBUTION

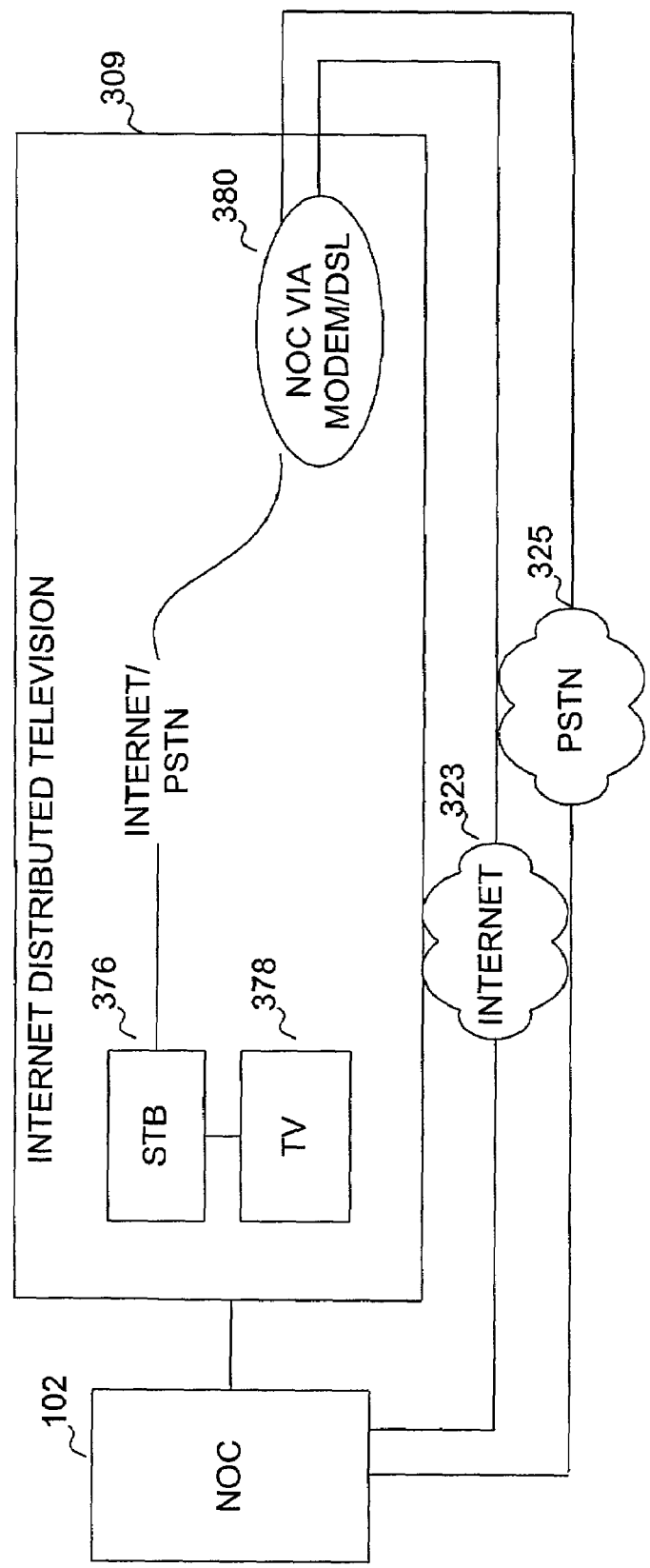

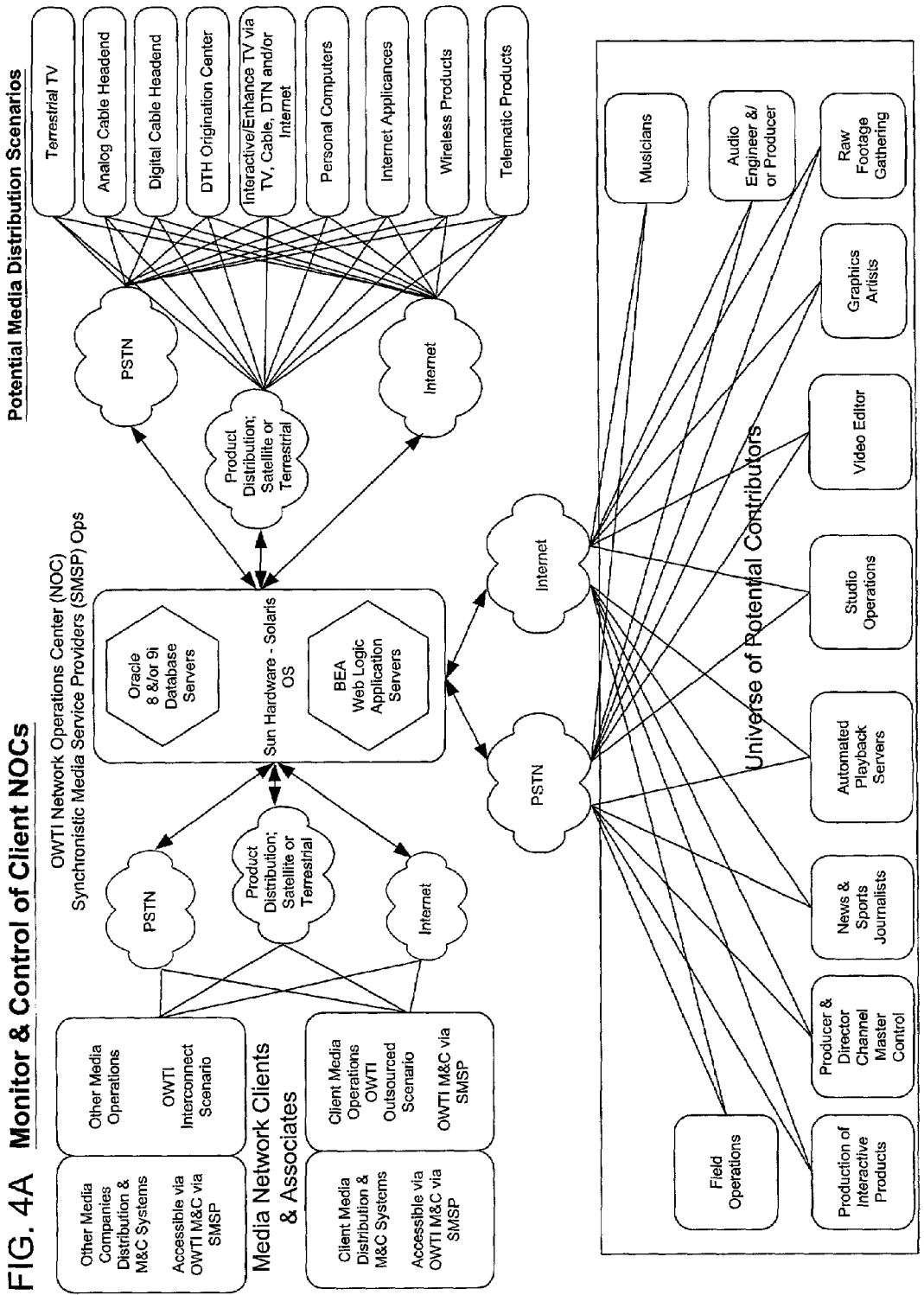
FIG. 4A  Monitor & Control of Client NOCs

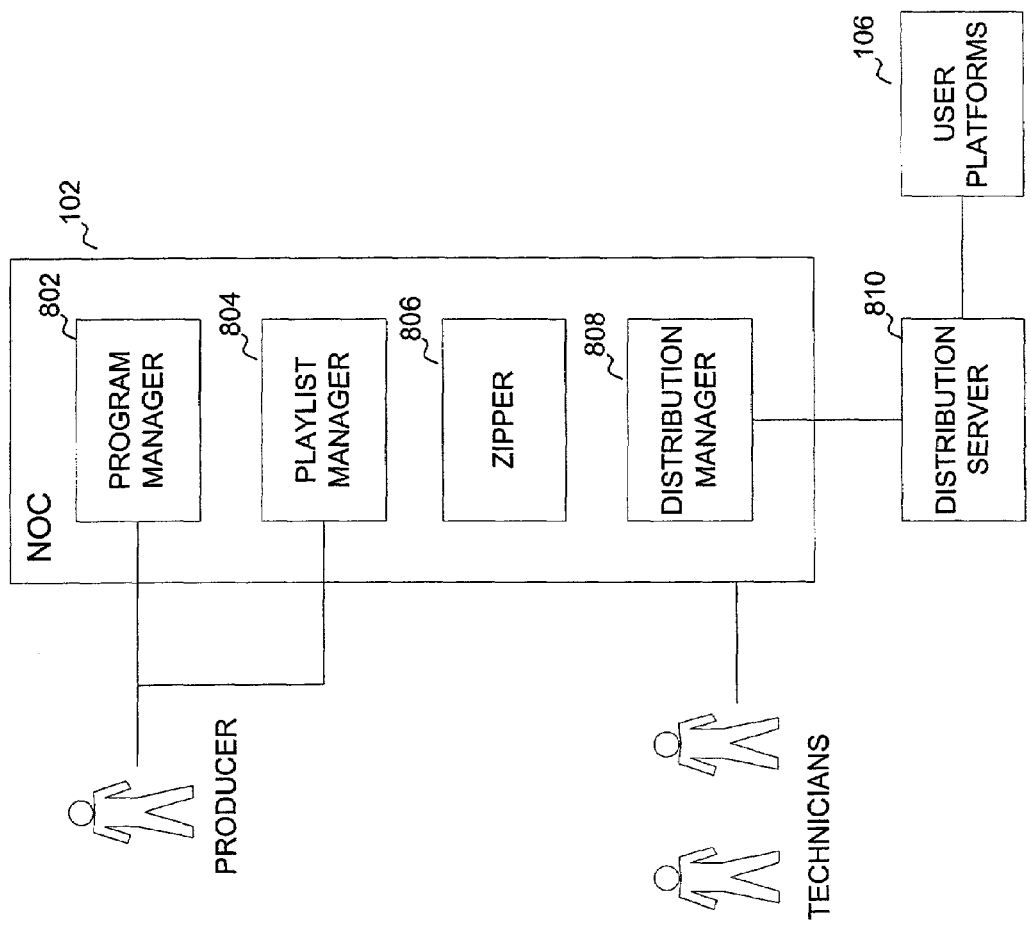

SYSTEM AND METHOD FOR COLLABORATIVE, PEER-TO-PEER CREATION, MANAGEMENT & SYNCHRONOUS, MULTI-PLATFORM DISTRIBUTION OF PROFILE-SPECIFIED MEDIA OBJECTS

This application claims the benefit of U.S. Provisional Application No. 60/248,558 filed Nov. 16, 2000, which is herein incorporated by reference in its entirety.

BACKGROUND

1. Field of the Invention

The present invention relates generally to the creation, management and distribution of media objects. More specifically, the present invention relates to the creation, management and distribution of media objects using a standards-based, open system approach and central server configuration utilizing J2EE, middleware and/or XML functionality to integrate legacy systems into a web-based environment so that they can be accessed by a variety of contributors to create television broadcasts and associated enhanced media services.

2. Background of the Invention

Television production and/or distribution have remained essentially unchanged for decades. Despite quantum leaps in technology during this timeframe, television remains essentially a box-to-box type environment. In live television, for example, a camera sends a video signal to a production switcher that sends and/or receives video signals to or from videotape- or hard drive-based recording devices for replay and/or playback, digital video effects (DVE) equipment for graphical enhancement and/or a fiber or satellite system for receipt of other video contribution and/or transmission. In recorded television, a camera sends a video signal to a production switcher that sends and/or receives video signals for recording and/or playback, edit facilities for the manipulation of video and graphical elements needed to create the final product, DVEs for creation and contribution of graphical enhancement and/or to videotape and/or hard disk recorders for recording of the final product. The recorded final product is then routed through a switcher and/or video router for transmission. Each of these television paradigms uses a serial presentation of the television programming.

The past few years have seen the emergence of digital video. The rapid growth of the Internet has allowed new techniques for creating, managing and distributing video. However, even with these flexible computing environments, large media companies adhere to the old model regarding terrestrial broadcasting, cable TV and/or Direct to Home (DTH) television networks due to 1) the desire to continue to depreciate existing capital equipment and support systems and/or 2) the complexity and cost associated with replacing and/or integrating all of the related equipment, subsystems and/or applications into a singular automated, IP-enabled system. Although these companies would like to take advantage of the functionality and flexibility allowed by web-based, IP and/or Open systems technologies, obtaining such automation benefits and economics has to date required building a wholly separate IP and/or web-based approach to the creation, management and deployment of video networks.

Developing such systems and/or applications is costly, time-consuming and extremely complex. In addition, due to the proprietary nature of legacy and existing TV systems, they are limited in their ability to integrate with other systems and/or scale, if they can even scale at all. Even after the system and/or application is developed; it may not accurately perform the functionality originally required due to the requirement of integrating numerous proprietary systems and/or applications. This approach results in a practically unmanageable matrix of subsystem interaction and coordination that will result in working out residual bugs and/or adding omitted functionality only adds cost and delay to the effort.

If such applications are not developed, production companies and service providers must continue to rely on legacy systems to provide the needed functionality. Legacy systems are proprietary, usually single-function systems that were developed to perform a particular task. These legacy systems include systems to manage customer/user databases, systems to manage production facilities, systems to control videotape machines, cameras, and lighting and systems to manage a number of other components of television production.

A significant problem with these systems is that they were not designed with any intention to communicate with other systems. Consequently, even small integration can be very difficult and subject to error. As a result, it was generally easier and more cost-effective for each company to develop a legacy system for each television broadcasting function it desired to provide.

Another problem associated with conventional television production is that it is a single object, push technology. That is, when a television program is produced, it is a single video object pushed and/or broadcasted to everyone. Thus, everyone tuned to a particular channel at a particular time has the same viewing experience. There is no individualization or customization associated with this viewing experience. Each viewer sees the same content in the same order in the same manner. Thus, there is no targeting of content to meet the needs of the viewer. For example, each person sees the same advertisements at the same time whether they are of interest or not and whether the person is there to view them or not.

A conventional environment where user interaction and/or user specific customization is provided is the Internet. Internet users often receive content based on user profiles, such as cookies, created by the web sites they visit. As a result, the user's Internet experience is enhanced because they are presented with content that is more likely to be of interest to them at a time when they are likely to see it.

One way this customization is provided in the client-server environment of the Internet is through use of Java server pages (JSPs). In general, the functionality and tools for presenting web pages to users are located in a central server or facility. When a user makes a request through the web-based structure of the Internet, the request will generally encounter a JSP. The JSP provides a means to present particular content to a particular user. In this manner, the Internet can customize the viewing experience for each user. For example, the JSP can utilize enterprise Java beans (EJBs). EJBs are a means through which resources, data and/or applications can be utilized within certain rule sets, and through utilizing these certain tools cause any particular content to be presented to a user in any particular manner. Accordingly, EJBs can search an Intranet and/or the web for particular utilities required to present the content. For example, if a user desires to see a movie play on his computer screen, the request for the movie might encounter a JSP accessing an EJB that searches for a movie-playing utility, such as a Real Player decoder, to play the movie to the user.

An advantage of using Java-based applications is that they are not confined to a particular platform. Each platform, whether it is an IBM PC, a MAC, a UNIX platform or some other platform utilizes a JAVA virtual machine (JVM). A JVM executes code written in Java. Every machine executing a JVM can execute Java application, such as applications containing instructions for presenting web pages to users. As a result, a JAVA application need only be written once because it will execute on any platform with a JVM.

Despite the promise of the Internet, and web-based technologies in general, these technologies have not made their way into the television production and broadcast arena on a large scale. Thus, there have been no "cradle-to-grave" implementations of a broadcast environment. "Cradle-to-grave" refers to activity from the producer's original conception through the camera lens into the editing environment, transmission and ultimately to the viewer's screen, and includes information that may be sent back by the viewer. It includes every functionality that can be attributed to an environment that creates, manages and distributes media content via any number and/or types of distribution technologies; i.e., TV, Cable, DTH, Internet, Intranet, Wireless, and others.

There have been a few systems and/or standards-based approaches designed to provide interfaces to legacy systems. These systems use middleware and/or XML standards based implementations to provide these interfaces. A number of such middleware system are based on the Java 2 Enterprise Edition (J2EE) standard. For example, J2EE-based middleware implementations are provided by Sun's Planet One, IBM's Websphere and Bea System's Weblogic. Bea's Weblogic System is commonly considered best-of-breed and has the largest market share at this time. The middleware provides the interfaces to legacy systems, applications and data by providing the entire rule sets as well as network and application interfaces, XML implementations and functionality for a particular system and/or application. The interfaces allow a unified approach to the simultaneous control and utilization of numerous legacy systems so that they can be utilized in a singular, scalable, profile-driven implementation. That is, they draw the functionality of the legacy systems into a J2EE environment so that an Enterprise Intranet and/or web-based technologies can access them. In addition, where utilities or other data are required, the J2EE environment describes where to get them. In addition, new technologies such as XML facilitate moving data between legacy systems and web-based environments that access them. However, there are no systems that integrate the various broadcast equipment, legacy support systems and/or distribution systems to provide integrated cradle-to-grave functionality for synchronous distribution of object oriented media products across various distribution platforms to provide scalable, profile-driven and/or interactive media products.

SUMMARY OF THE INVENTION

The present invention solves the foregoing problems in the art by providing a scalable J2EE implementation running best-of-breed middleware. The J2EE middleware interfaces with television broadcast legacy systems and equipment and integrate them into a singular J2EE implementation. The middleware provides contributors a browser-based J2EE interface to the singular system implementation and by definition to legacy systems, equipment and functionality. Because the environment is J2EE-based, it is easily scalable to an environment capable of handling many millions of simultaneous, profile-driven services.

Further, using an Intranet and/or web-based embodiment, the present invention allows users to customize their viewing experience. In addition, contributors can customize products for users based on user preferences stored in a profile or other memory files and/or devices.

Preferably, a centralized operations center consisting of a fault tolerant, clusterable multi-processor hardware platform running a UNIX type operating system (OS) such as Sun Solaris, Linux or BSD with a "best of breed" database and middleware such as Oracle 9$i$ and BEA System's Weblogic, respectively, termed a network operations center (NOC) controls security, files access, creation, management and distribution of object-oriented television programming using playlists and hierarchical user and/or client classifications. Because all access to object-oriented media elements destined for distribution and/or subject to management for "on-air" distribution is managed through one or more playlists, the present invention can synchronize television product creation, management and distribution. Thus, for example, audio and video objects can be created and/or directed to play at any desired time or in any order and can be synchronized within and across any number of distribution platforms. It is also worth noting at this point that this system design is capable of creating, storing managing and distributing media elements among "group members" identified through the classification methodology without reference to a play list. Playlists are necessary once a program and/or specific presentation is needed and/or determined.

In one embodiment, the present invention is a system for managing television programming elements and/or objects. The system has a network operations center (NOC), which has an Intranet and/or IP-based middleware interface to one or more legacy systems executing on it. The middleware interface communicates with one or more legacy systems that provide television contribution, production and distribution system functionality. The television programming contribution, production and distribution system functionality provides any processing required to create, manage or distribute television programming. One or more contributors create television programming elements and/or objects by accessing the legacy system television programming functionality using an IP-based interface provided by the NOC. The television programming elements and/or objects are distributed to one or more user platforms. The user platforms receive the television programming elements and/or objects and are displayed to the user either directly or indirectly.

BRIEF DESCRIPTION OF THE DRAWINGS

FIG. 1A is a schematic diagram illustrating an embodiment of the present invention utilizing management and control of client NOCs, outside data and information providers, media object production resources and a variety of distribution platforms

FIG. 3E is a schematic diagram illustrating a NOC coupled to an Internet distribution television system.

FIG. 4A is a schematic diagram illustrating the present invention in an outsourcing mode demonstrating monitor and control of multiple client NOCs

DETAILED DESCRIPTION OF THE INVENTION

Figure 1:
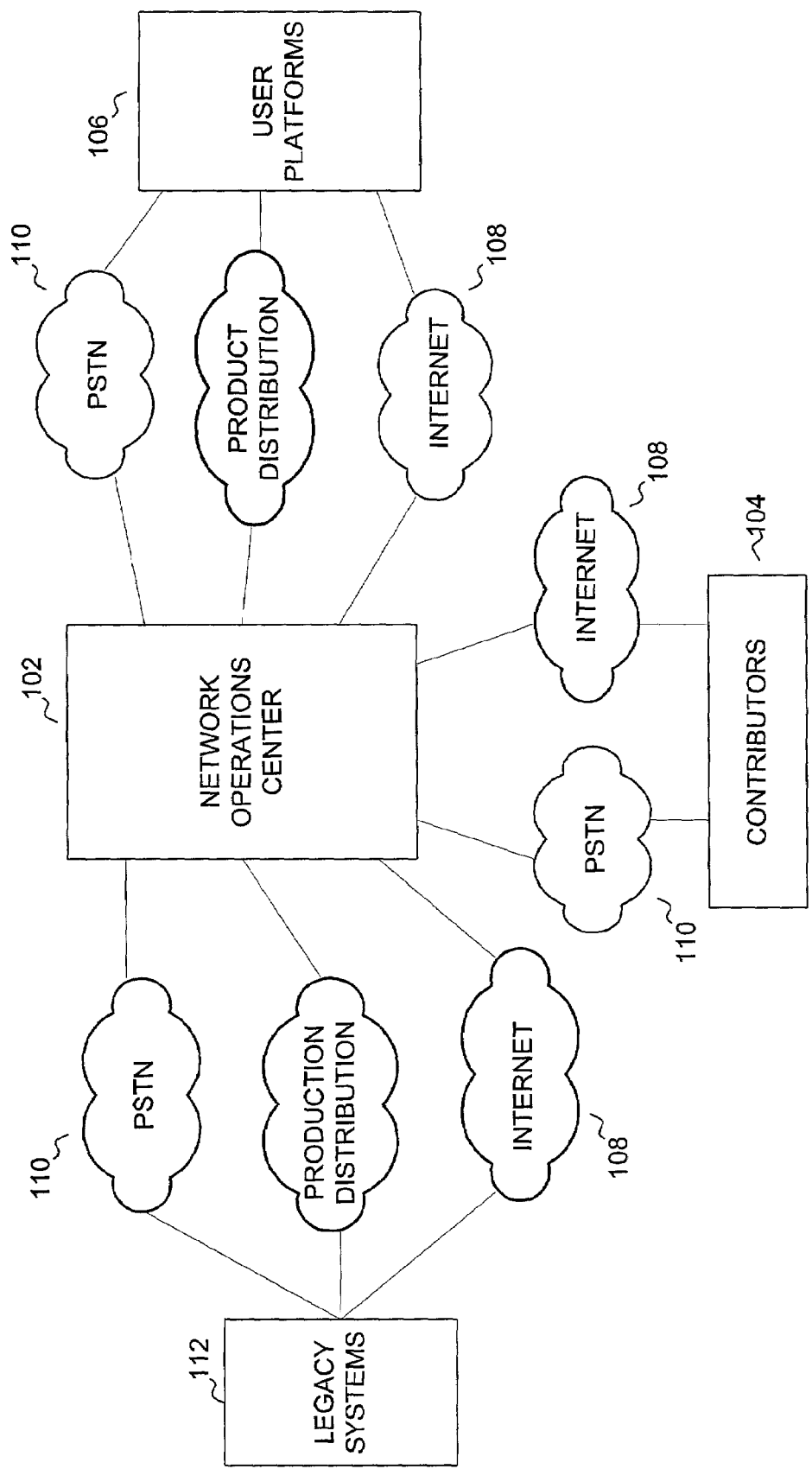
FIG. 1 is a schematic diagram illustrating an embodiment of the present invention.

FIG. 1 is a schematic diagram illustrating an embodiment of the present invention. A network operations center (NOC) 102 coordinates and organizes communication between contributors 104, users 106 and media clients 112. This communication can occur over the Internet 108 or the PSTN 110. Any other communication medium can be used for communicating requests and responses including satellite-based communications.

NOC 102 is preferably a best-of-breed data center consisting of a fault tolerant, clusterable multi-processor hardware platform running a UNIX type operating system (OS) such as Sun Solaris, Linux or BSD with a "best of breed" database and middleware such as Oracle 9i and BEA System's Weblogic, respectively that provides appropriate interfacing and connectivity to media legacy systems 112, machine control and equipment such as provided by contributors 104. As such, NOC 102 is preferably an Open standards Unix type system utilizing a J2EE environment running a best of breed middleware implementation that can provide IP-based management of contributor legacy systems 104 as well as object oriented product distribution to user platforms 106. An exemplary NOC is a data center utilizing SUN hardware, Sun Solaris operating system (OS), Oracle 9i database and Bea System's Web Logic middleware.

As discussed above, using a J2EE standards based approach allows users to customize their interfaces and experiences based a JSP type of approach. This is done using individualized EJB resources in the J2EE environment to cause the environment to behave as the user desires.

In addition, a fault-tolerant, clusterable, multi-processor based hardware platform utilizing a Unix type OS such as Solaris, Linux and/or BSD and a high performance database such as Oracle 9i in a J2EE configuration provides scalability in addition to profile-driven customization of programs, products, services and applications. Scalability exists because this particular configuration of hardware, OS, database and middleware was designed to support millions of simultaneous profile defined users. In addition, this implementation is capable of integrating any user connected to NOC 102 using any device capable of executing a Java virtual machine (JVM). As a result, NOC 102 provides a high performance ability to handle millions of individual users on a personalized basis no matter what OS or proprietary application the user is utilizing.

Figure 1B:
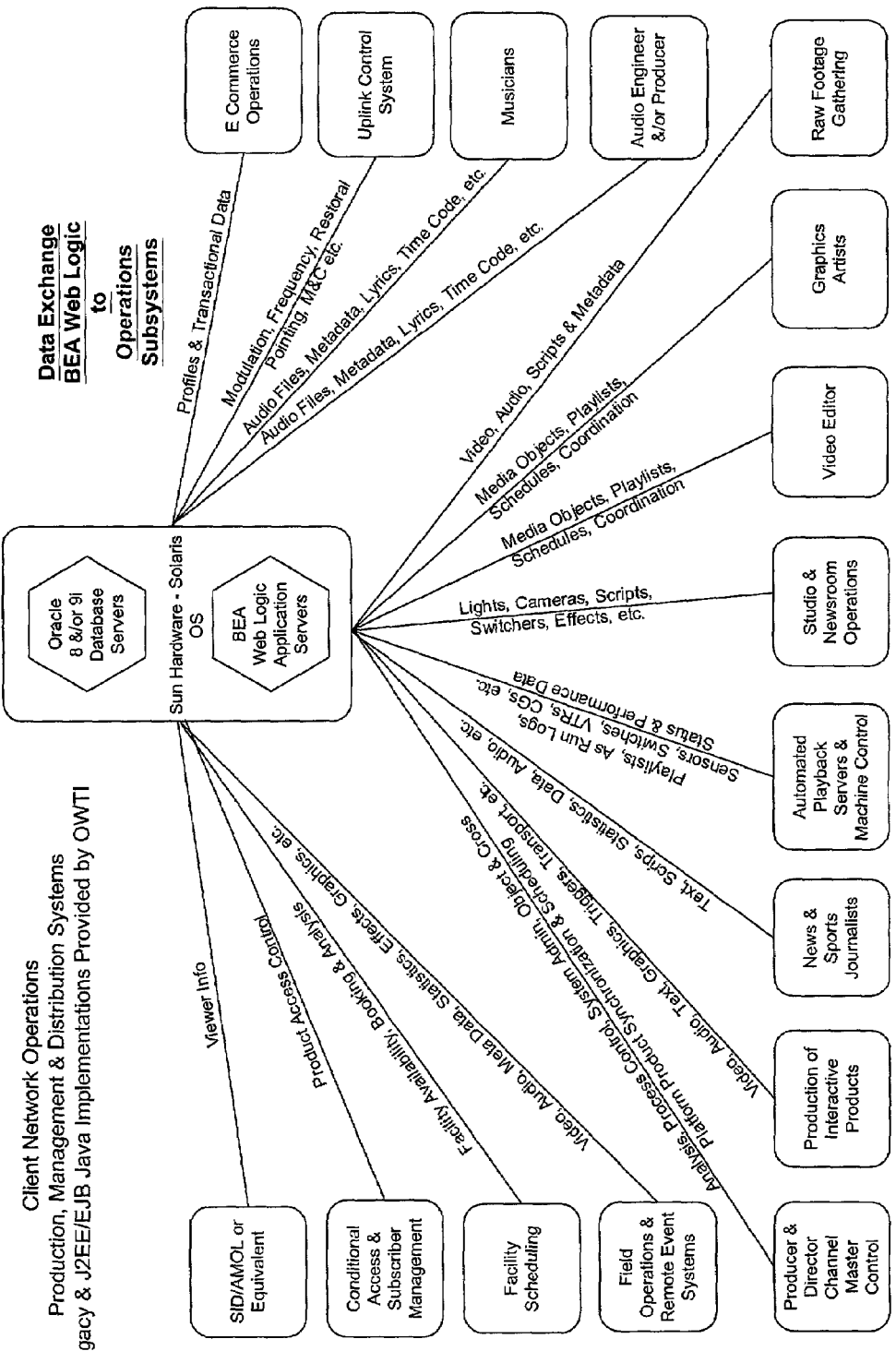
FIG. 1B is a schematic diagram illustrating exemplary legacy systems and type of data integrated via J2EE middleware to the NOC.

Any legacy system can be included in contributors 104. As described above, legacy systems, machine control and/or equipment 112 can provide any functionality that is required to produce and distribute media elements and/or objects to viewers. In addition, legacy systems 112 can provide other information related to the final television and/or video product and its usage. Exemplary legacy systems and contributors 104 are described with reference to FIG. 1A. FIG. 1B is another schematic illustration showing the relationship of NOC 102 with legacy systems, contributors and user platforms.

One legacy system is a viewer information system that extracts viewer information based on what a particular person is watching. For example, Neilson program information contained in the programs video blanking interval (VBI) is utilized to determine ratings by utilizing a Neilson provided set top box to determine and retrieve viewer's TV watching behavior. This information is collected on a server 120 that records and tabulates a viewer's viewing habits. The viewer information system provides viewer information to NOC 102 to be accessed by networks, advertisers, contributors and/or users. The viewer information can be collected in raw form or it can be collected after it has been processed.

Another legacy system is an access control system 121 that manages conditional access and subscriber services. Access control systems 121 provide services only after verification or authorization. Such systems include pay-per-view or subscription services like HBO, Showtime and other premium television services. NOC 102 can obtain product access control information from an access control system to provide access controlled services to users.

Another legacy system is a facilities scheduling system 122. Facilities include any facilities that can be used in television program production and distribution. For example, facilities include videotape recorders, graphics machines, vehicles, cameras, studios, editing facilities, special effect machines and other facilities. because these facilities are limited, their use must be scheduled. NOC 102 can coordinate scheduling of these facilities. NOC 102 interfaces with legacy systems to obtain information relating to availability, booking and analysis of facility systems to coordinate scheduling of these facilities.

Another legacy system manages field operation system 123. Field operation includes obtaining data from and providing to personnel in the field. For example, sportscasters may require statistics for their broadcasts. Another typical field operation is remote and/or machine control of television cameras and/or other equipment. Field operations also include connecting field personnel with subject matter experts. NOC 102 provides connectivity to legacy systems that manage field operations. This connectivity provides audio data, video data, statistics, effect, graphics and other data to NOC 102 so that contributors 104 can manage field operations.

Contributors 104 include any persons or devices that provide input to produce or distribute television programming. Often, contributors 104 require access to legacy systems 112 to produce and distribute television programming.

For example, one set of contributors includes producers, directors and technicians that control television program production from a control room. These contributors interact with one another to produce a television broadcast. Using NOC 102, these contributors obtain access to any required legacy systems to manage control room operations to produce a television broadcast. These contributors use NOC 102 to provide analysis, process control, system administration and object and cross-platform product synchronization and scheduling to produce and distribute the television broadcast.

Another contributor may be a producer of interactive products 124. These products include products such as Open TV, Liberate, Microsoft Front Page and other products that developers use to develop object-oriented programs. These contributors provide video, audio, text, graphics, triggers and transport information to NOC 102 that can be used to create television broadcasts.

Another set of contributors may include news and sports journalism contributors and/or systems 125. News wires, for example, AP and Reuters, and other information sources, for example, Bloomberg data, can provide material to NOC 102. For example, a user could cut material from a news feed and then paste that data into a dialog box that is provided to a news anchor. The news anchor can then read the information from the dialog box. These contributors can also filter information of interest and store that information in a file or other storage device dedicated to storing that type of information. This filter can be calendar-based. For example, the calendar filter may have a schedule of events. When a particular event approaches, the filter can look for information related to that event in the news feed data. In addition, the calendar filter can be programmed with a schedule of television shows. In that way, the calendar filter can cause information to be directed to the appropriate place to support a given program. News and journalism contributors 125 provide NOC 102 with scripts, text, statistics, data, audio and any other data related to news and sports journalism.

Another contributor may be an automated playback server 126. Generally, this contributor is a computer that plays back a series of objects that are part of a playback list. For example, this legacy system can play back television channels wherein each object is a television program, promo, commercial or other full screen material for that channel. In this mode, the playback server inputs completed full screen products and outputs them according to a playback list to create the channel. This contributor provides NOC 102 with play lists, as run logs and status and performance data.

Another contributor may be a provider of information regarding studio and newsroom operations 127, i.e., regarding the physical aspects of television broadcasting. For example, this contributor can provide status, machine control and other data and/or functionality for cameras, lighting and teleprompters. This contributor can also provide scripts. NOC 102 can access this information and make it available for use by other contributors.

Other contributors may include video editors 128, graphics editors 129, and raw-footage gatherers 130 (including, e.g., camera inputs from the field), audio engineers and musicians. Video editors 128 and graphics editors 129 provide NOC 102 with media objects, playlists, schedules and coordination. Raw-footage gatherers 130 provide NOC 102 with audio, video, metadata and scripts. Musicians and audio engineers provide NOC 102 with audio files, metadata, lyrics, time codes and other audio or live music data.

Another set of contributors are the users of user platforms 106. These users can be given authorization to use NOC 102 to access legacy systems 112 to create their own television programs by using legacy systems 112.

User platforms 106 are generally edge servers and/or JAVA-based players. These devices receive both finished full screen television programming as well as television programming elements and objects from NOC 102 and provide the television programming directly or indirectly to users in a real-time and/or store and forward fashion. These devices are also capable of providing customized, full screen and/or interactive viewer experiences whether via an edge server and/or JAVA-based player located at a terrestrial TV, cable or DTH headend or via a set top box in the viewer's location.

In some embodiments, the invention may utilize one or more edge servers and one or more JAVA-based player devices to integrate wireless QOS for the distribution of rich media.

One example of user platforms 106 includes E-commerce applications and customization 131. For example, these systems can be programmed to provide targeted advertising for a particular product or set of products while viewing particular programs. Users of such systems can click on a product to select to purchase it. Through pre-established profiles, these systems know a user's purchasing preferences, for example, whether to purchase by credit card, debit card, direct access to a bank account, or some other method of payment. The user's profile will have other information required for the purchase, such as card number, bank account number, access and authorization information and any other information required to complete the purchase. Profiles also contain user preferences for delivery, including for example, preferences for overnight delivery or delivery by a certain delivery service.

The present invention allows contributors to use legacy systems 112 in an IP-based environment by using NOC 102 to create and distribute television programs. Contributors can perform any task required to produce television programming using NOC 102 as an interface to legacy systems 112. Moreover, using NOC 102, the television programming so created can be distributed to one or more user platforms 106 both separately and/or in a synchronous, simultaneous manner. NOC 102 coordinates legacy systems 112 in a ubiquitous, scalable, environment that allows millions of users the opportunity of dynamically-changing customized products that they create and/or are created for them using the legacy systems 112. NOC 102 provides an ability to manage television program creation and control for a large number of users or sub grouping based on inputs from a variety of contributors which are grouped together in any number of ways whether dictated by a certain network, delivery scheme, program, interest group, region, family, etc.

Figure 2:
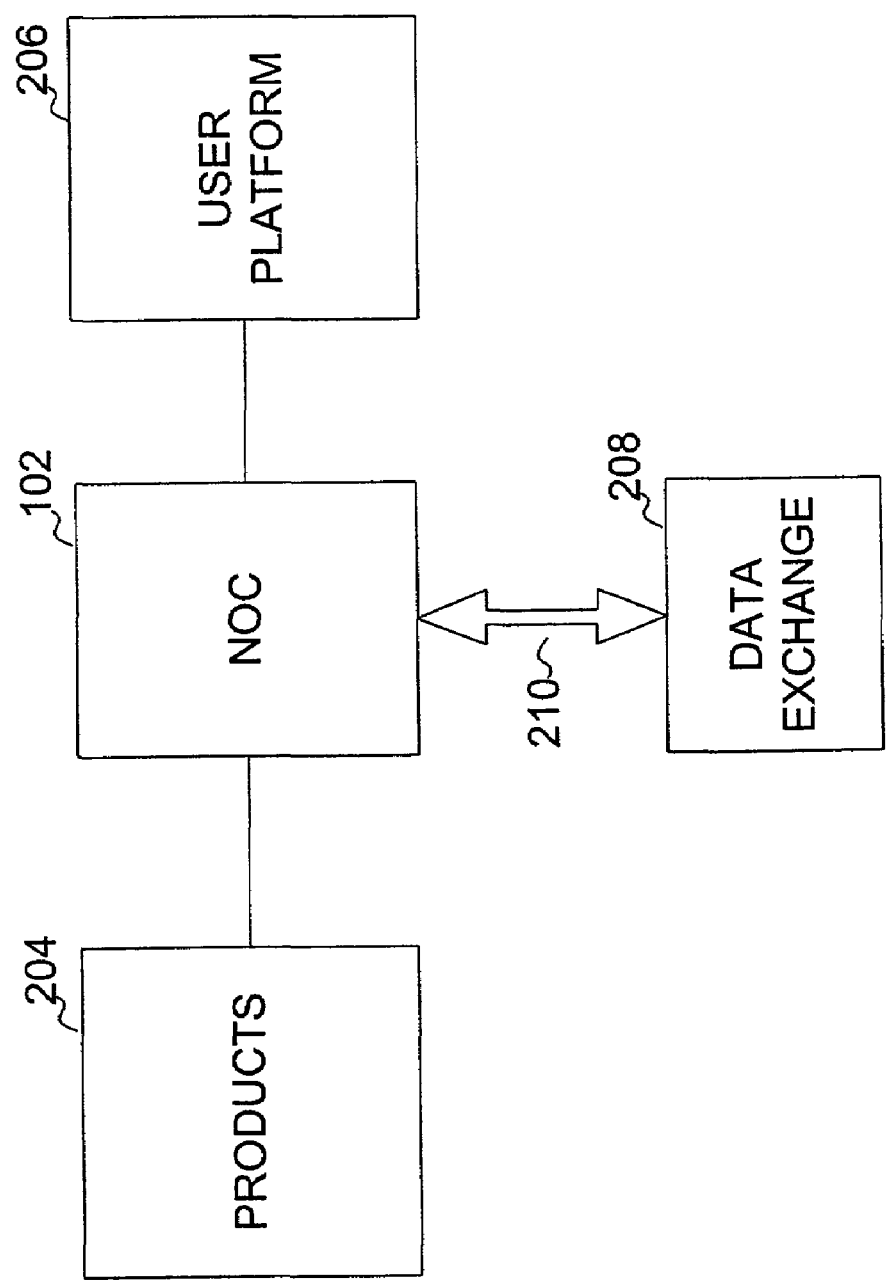
FIG. 2 is a schematic diagram showing the distribution of products to different user platforms.

After products, for example, television programs, are created, they can be distributed to viewers in a variety of ways. This distribution is controlled by NOC 102. FIG. 2 is a schematic diagram showing the distribution of products to different user platforms. NOC 102 coordinates transmission of one or more products 204 to one or more user platforms 206.

Examples of products include terrestrial television, direct-to-home television (DTV) and cable television products in both analog and digital implementations, interactive and enhanced TV products, web-enabled PC products, web appliances, personal video recorders (PVR), consumer electronics, games, security and wireless device products. The products can be global, national, regional, local, interest group and/or individual in scope. Global products have universal interest for all viewers. national products are directed to a target country. Such products might, for example, be in a language of a particular country. Regional products have a more limited viewer ship than global or national products. An example of a regional product might be sporting event in the Eastern region of the United States. Local products have local scope. For example, local programming might include a local news station. Interest group programming may address interests in sports, fashion, shopping and/or travel as an example. Finally, a product could be delivered just for a particular individual. In addition, the products can be personalized or individualized based on profiles as described above.

A data exchange 208 may be used to support NOC 102 to allow it to communicate with all product sources and user platforms. When used, data exchange 208 provides a standard communication environment for allowing NOC 102 to communicate with the various product sources and user platforms. Data exchange 208 is supported by a high speed LAN 210 or any other IP enable transport whether it be provided over fiber optics, copper, wireless and/or satellite systems.

Using data exchange 208, a contributor can implement roll types in play list creation. Roll types allow a user to automatically create a template or reuse certain pieces. For example, a contributor who creates an HDTV television product may distribute a lower resolution copy of the same program for regular television distribution. In addition, the user desires to create a web-capable version of the television program as well. Using the present invention, the contributor can instruct NOC 102 to cause data exchange 208 to automatically generate multiple product implementations of a generated television program.

Preferably, data exchange 208 uses transcoders that can take one product and convert it to another format. For example, a matrix containing a relationship of items according to different playlist matrices across multiple products can be made. The relationship is a set of rules that defines how transcoding between different products is to be accomplished. Using this relationship matrix, any product can be converted into any other product through transcoding. Preferably, this transcoding matrix is predetermined.

For example, using transcoders in the television program example, the HDTV program can be encoded as 19 megabits, the standard television as 8 megabits. The web product can be set up for broadband distribution encoded at 1 megabit. Dial-up web users might have access to the television program encoded at 300 kilobits or 56 kilobits. A user of the 3G mobile device can access the television program encoded at 1 megabit.

FIGS. 3A–3F are schematic diagrams illustrating user platforms that can receive the products for viewing by users. User platforms include terrestrial TV, analog & or digital cable TV, interactive/enhanced TV, DTH satellite, Internet distribution TV and wireless/web appliances.

Figure 3A:
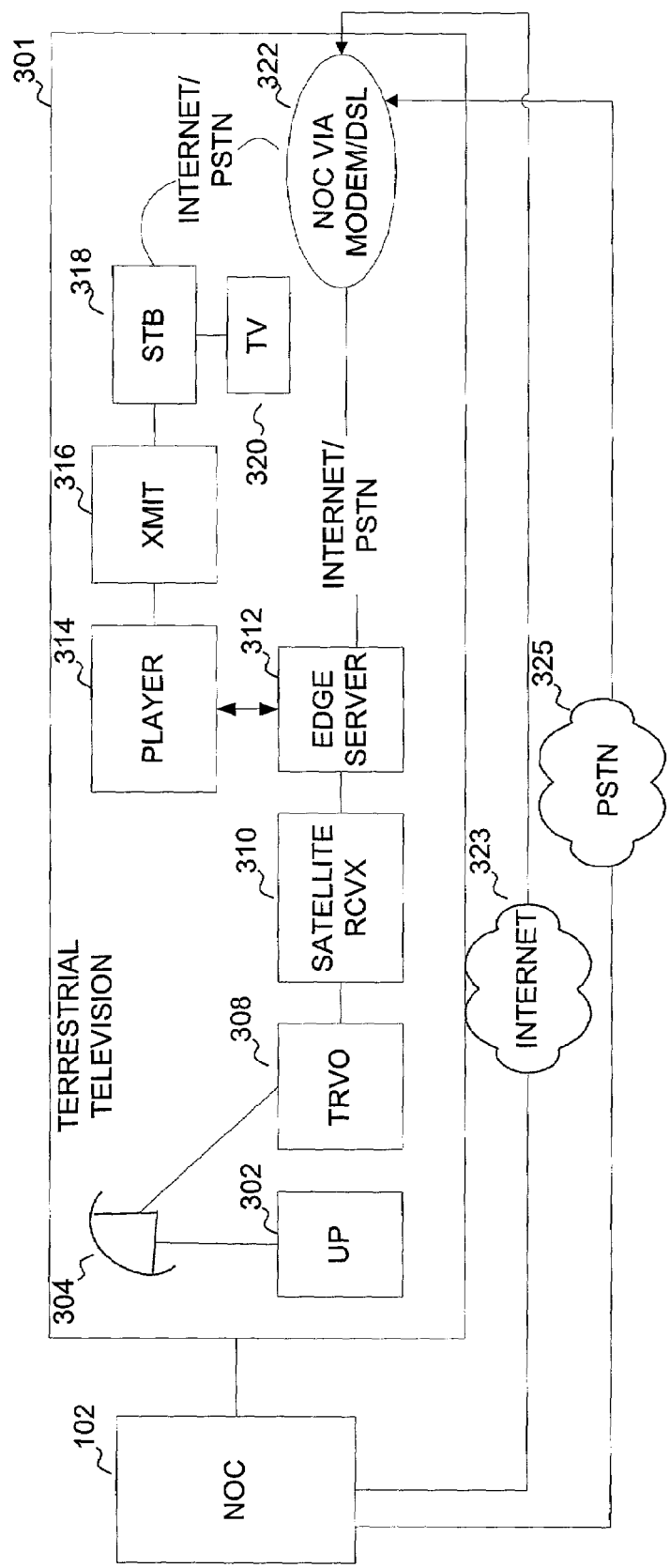
FIG. 3A is a schematic diagram illustrating a NOC coupled to a terrestrial television system.

FIG. 3A is a schematic diagram illustrating NOC 102 coupled to a terrestrial television system 301. NOC 102 provides a media objects, playlists and other data necessary to create a terrestrial television signal to uplink 302. Uplink 302 transmits the media objects, playlists and other data necessary to create a terrestrial television signal to a satellite 304. Satellite 304 transmits the terrestrial television signal to a television receive only earth station (TVRO) 308. TVRO 308 forwards the terrestrial television signal to a satellite receiver 310 that forwards the media objects, playlists and other data necessary to create a TV signal to an edge server 312. Edge server 312 is in communication with a JAVA-based player 314 that compiles the final signal and forwards the signal to a transmitter 316, which transmits the signal to a set-top box (STB) 318. STB 318 is connected to a television 320 to provide television signals to the television for viewing. In addition, STB 318 can send and receive commands to NOC 102 via a communication device 322. Communication device 322 can be any communication device for communication with the Internet 323 or PSTN 325, such as a modem or DSL line.

Figure 3B:
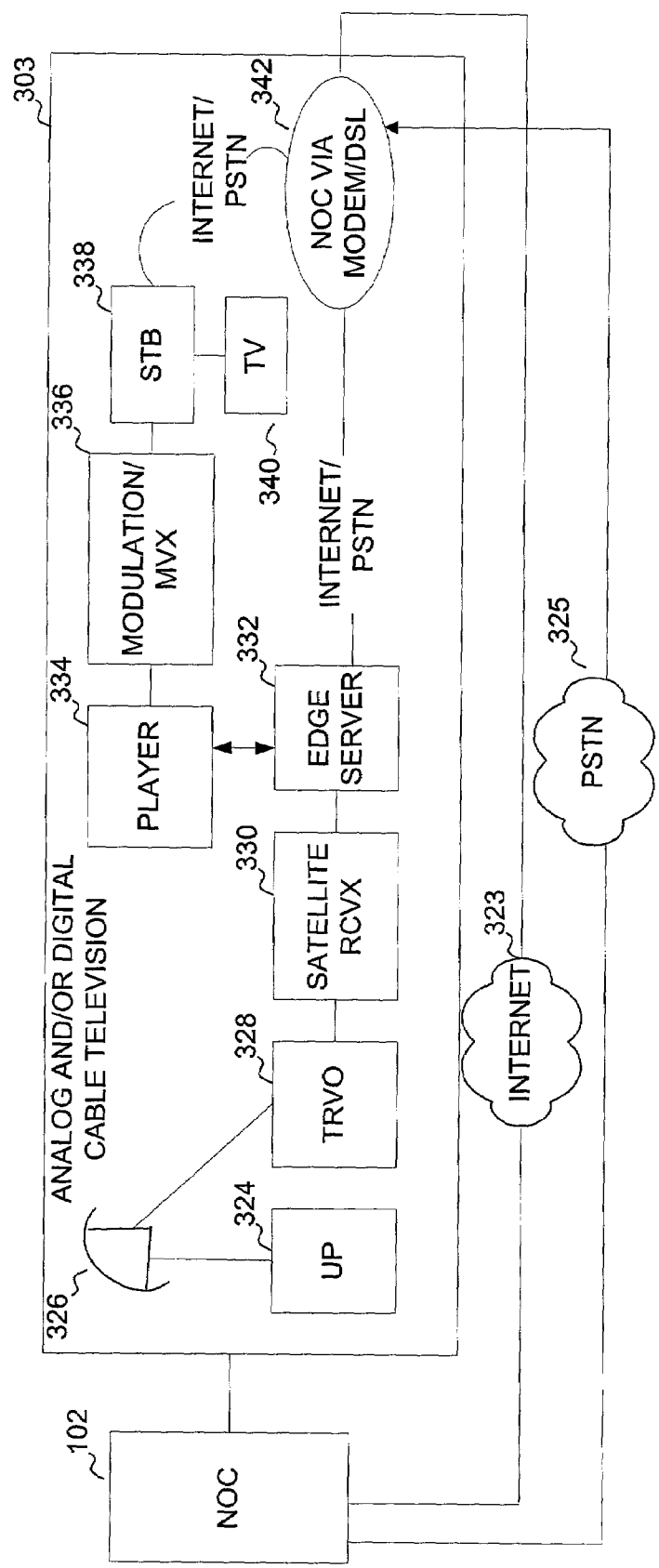
FIG. 3B is a schematic diagram illustrating a NOC coupled to an analog and/or digital cable television system.

FIG. 3B is a schematic diagram illustrating NOC 102 coupled to an analog and/or digital cable television system 303. NOC 102 provides media objects, playlists and other data necessary to create an analog and/or digital cable television signal to uplink 324. Uplink 324 transmits the media objects, playlists and other data necessary to create an analog and/or digital cable television signal to a satellite 326. Satellite 326 transmits the media objects, playlists and other data necessary to create an analog and/or digital cable television signal to a television receive-only earth station (TVRO) 328. TVRO 328 forwards the media objects, playlists and other data necessary to create an analog and/or digital cable television signal to a satellite receiver 330 that forwards the signal to an edge server 332. Edge server 332 is in communication with a JAVA-based player 334 that compiles the final TV signal that is forwarded to a modulation/multiplexing unit 336. Modulation/multiplexing unit 336 transmits the signal to a set-top box (STB) 338. STB 338 is connected to a television 340 to provide television signals to the television for viewing. In addition, STB 338 can send and receive commands to NOC 102 via a communication device 342. Communication device 342 can be any communication device for communication with the Internet 323 or PSTN 325, such as a modem or DSL line.

Figure 3C:
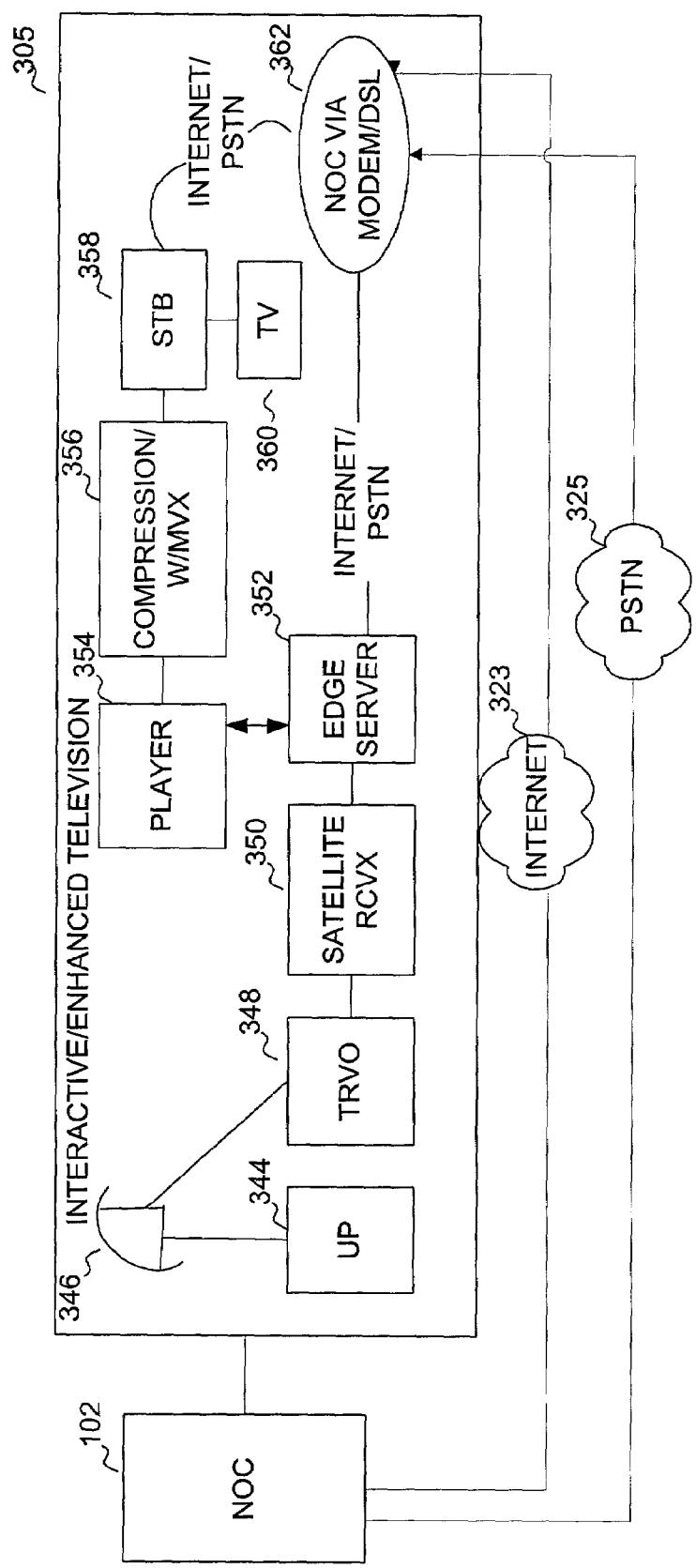
FIG. 3C is a schematic diagram illustrating a NOC coupled to an interactive/enhanced television system.

FIG. 3C is a schematic diagram illustrating NOC 102 coupled to an interactive/enhanced television system 305. NOC 102 provides media objects, playlists and other data necessary to create an interactive/enhanced television signal to uplink 344. Uplink 344 transmits media objects, playlists and other data necessary to create the interactive/enhanced television signal to a satellite 346. Satellite 346 transmits the media objects, playlists and other data necessary to create an interactive/enhanced television signal to a television receive only earth station (TVRO) 348. TVRO 348 forwards the interactive/enhanced television signal to a satellite receiver 350 that forwards the media objects, playlists and other data necessary to create the signal to an edge server 352. Edge server 352 is in communication with a JAVA-based player 354 that forwards the final interactive product signal to a transmitter and/or multiplexor 356, which transmits the signal to a set-top box (STB) 358. STB 358 sits on a television 360 to provide television signals to the television for viewing. In addition, STB 358 can send and receive commands to NOC 102 via a communication device 362. Communication device 362 can be any communication device for communication with the Internet 323 or PSTN 325, such as a cable modem or DSL line.

Figure 3D:
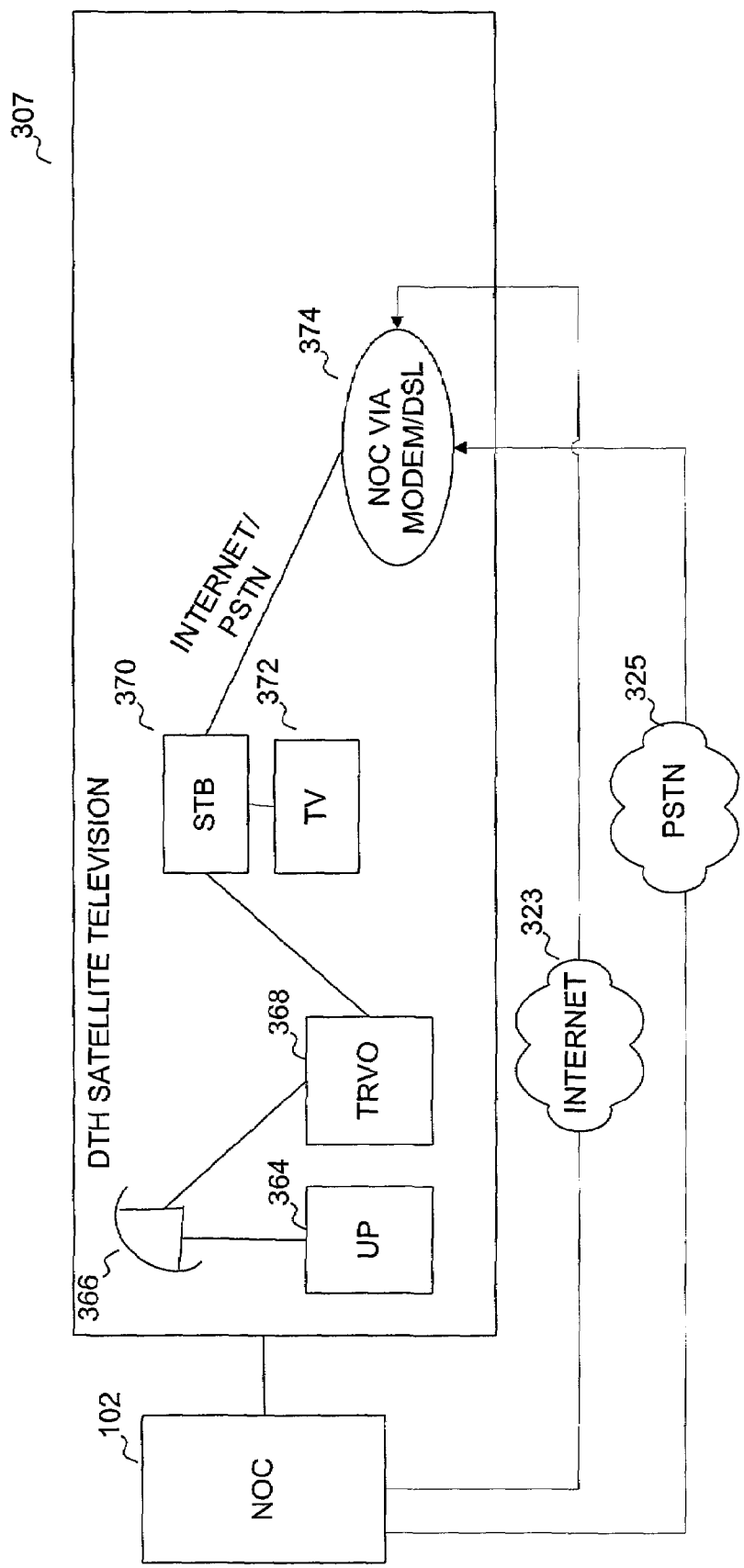
FIG. 3D is a schematic diagram illustrating a NOC coupled to DTH satellite television system.

FIG. 3D is a schematic diagram illustrating NOC 102 coupled to a DTH satellite television system 307. NOC 102 provides media objects, playlists and other data necessary to create a DTH television signal to an edge server 361 which is connected to a Java-based player 362 which in turn creates the final signal that is send to the multiplexor/uplink 364. Uplink 364 transmits the DTH television signal to a satellite 366. Satellite 366 transmits the DTH television signal to a TVRO 368. TVRO 368 forwards the DTH television signal to an STB 370. STB 370 is connected to a television 372 on which the DTH television signal is displayed. In addition, STB 370 can send and receive commands to NOC 102 via a communication device 374. Communication device 374 can be any communication device for communication with the Internet 323 or PSTN 325, such as a modem or DSL line. This particular scenario can be modified so the media objects, playlists and other data necessary to create a DTH television signal as sent to the end user STB 370 which can function as the on site edge server 361 and Java-based player 362.

FIG. 3E is a schematic diagram illustrating NOC 102 coupled to an Internet television distribution system 309. NOC 102 provides media objects, playlists and other data necessary to create a digital internet television experience to a communication device 380 over the Internet 323 or PSTN 325 or any other IP enabled network such as a broadband satellite system. Communication device 380 can be any IP communication device for communication with the Internet 323, PSTN 325 or any other network, such as a modem, DSL line and/or wireless or satellite terminal. Communication device 380 sends the digital Internet television objects, playlists, commands and files to an STB 376. STB 376 converts the objects, playlists, commands and files to a simplex or interactive television signal that can be displayed on a television 378.

Figure 3F:
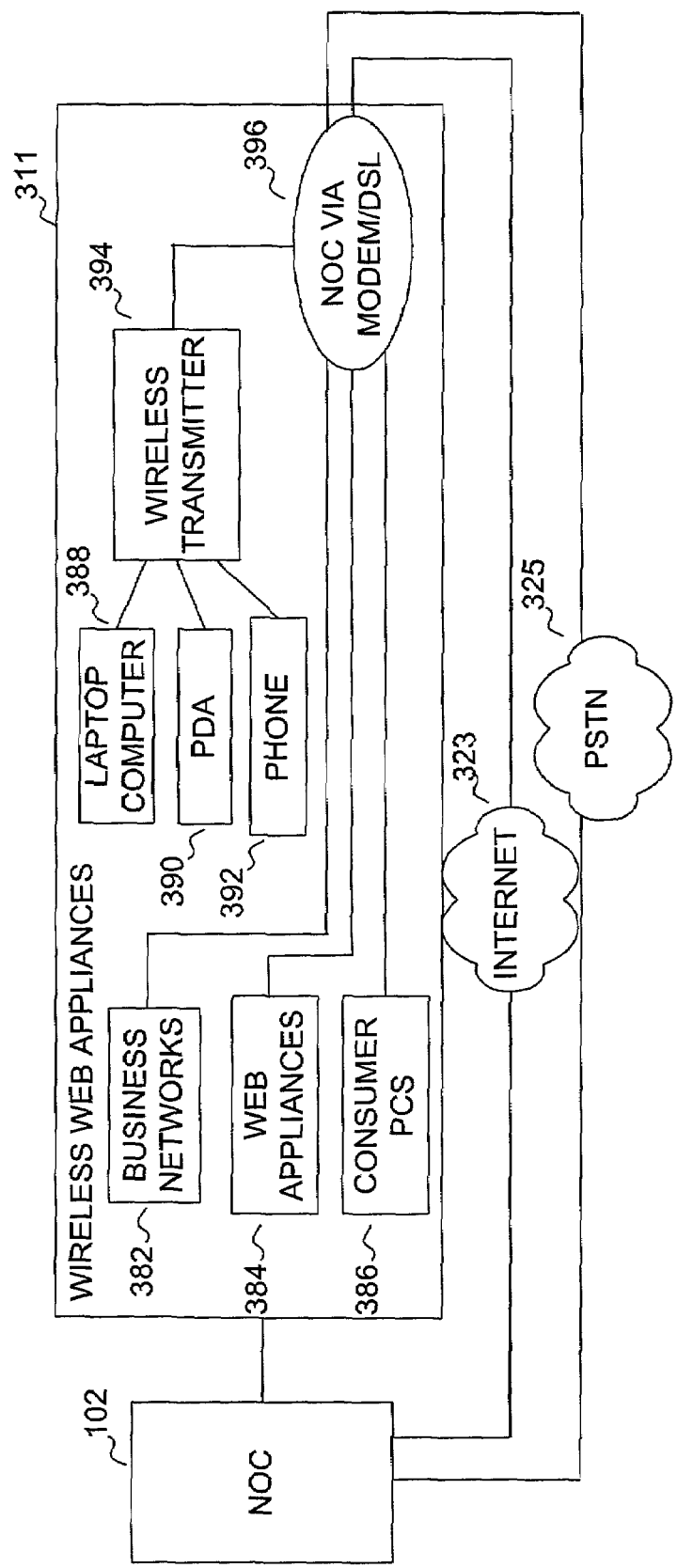
FIG. 3F is a schematic diagram illustrating a NOC coupled to a wireless web appliance system.

FIG. 3F is a schematic diagram illustrating NOC 102 coupled to a wireless web appliance system. NOC 102 is coupled to a communication device 396 over the Internet 323, PSTN 325 or any other IP enabled network. Communication device 396 is any communication device that can communicate with NOC 102 over one or both of Internet 323 and PSTN 325 or any other IP enabled network. Via communication device 396, NOC 102 provides content to any or all of business networks 382, web appliances 384 and consumer PCs 386. Examples of applications NOC 102 can send to these devices include business training seminars, retail applications, commercial or pay TV and/or any other product utilizing media objects whether in a simplex or interactive mode. NOC 102 can also provide full broadcast management capabilities to these systems as described above. Similarly, NOC 102 can send content or provide management functionality to a laptop computer 388, a personal digital assistant (PDA) 390 or a telephone 392.

Figure 4:
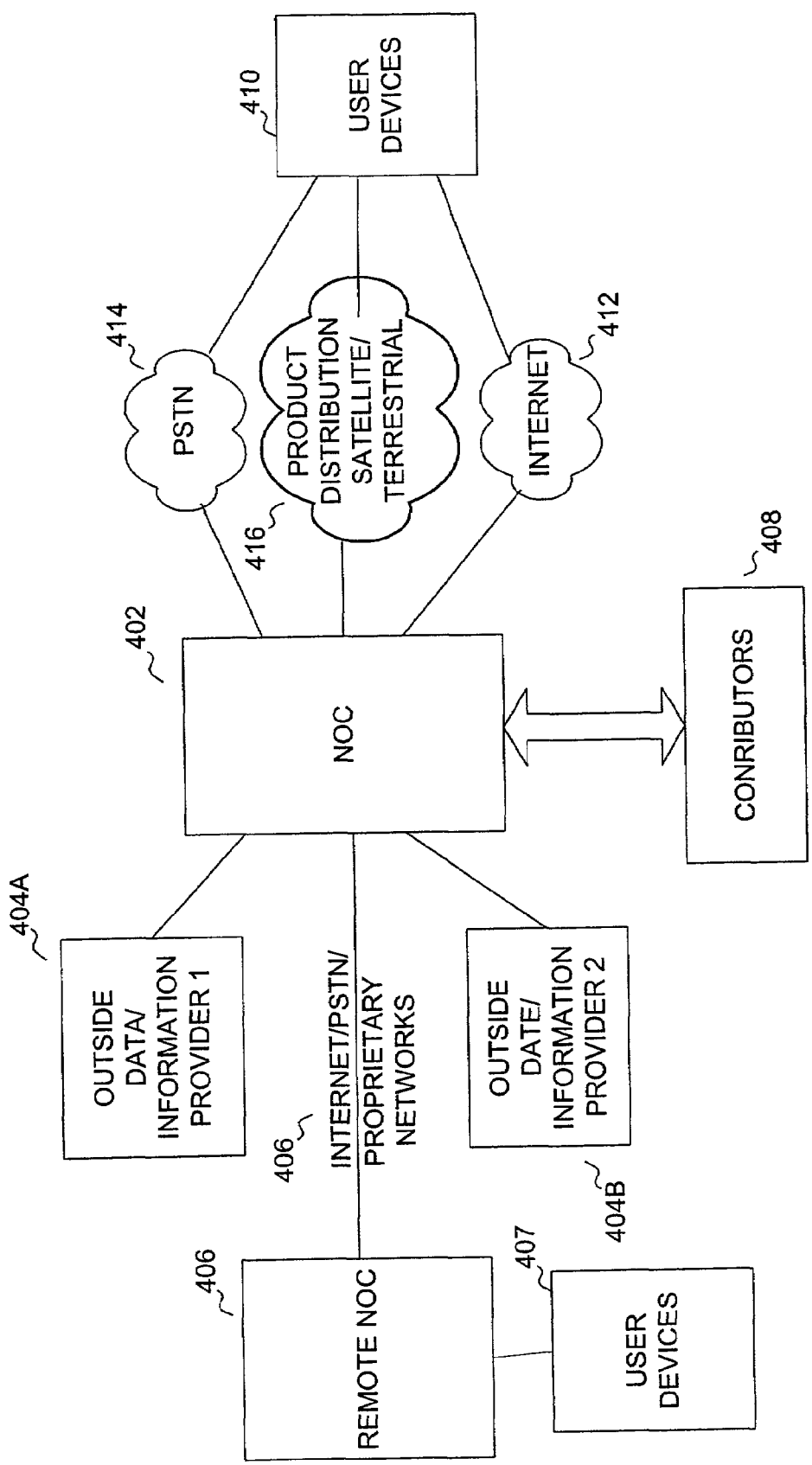
FIG. 4 is a schematic diagram illustrating a configuration for the using the present invention in an outsourcing mode.

FIG. 4 is a schematic diagram illustrating a configuration for using the present invention in an outsourcing mode. In this mode, NOC 402 is used to provide access to remote NOC 406. In this manner, remote NOC 406 can be deployed at a location where legacy systems 407 are located to provide the ability to manage these systems using the web-based J2EE approach of the present invention.

Remote NOC 406 is then coupled to NOC 402 so that the owner of legacy systems 407 does not have to concern itself with management of contributors 408. NOC 402 can also access data and information from outside sources 404A and 404B.

Using this configuration of the present invention, an entity can configure NOC 402 so that it provides access to users desiring to create products for distribution to user devices 410. NOC 406 interfaces with contributors 408, i.e., the legacy systems, to provide the product to the user devices 410. Product is distributed over the PSTN 414, Internet 412 or satellite/terrestrial distribution systems 416, as described above.

Importantly, remote NOC 402 can interface to a number of NOCs controlling various legacy systems. In this manner, remote NOC 406 can offer users access to many different services that are based on legacy systems owned by a number of companies. Moreover, all system participants can avail themselves of any resource, distribution path and/or end user connected through this system as further demonstrated in FIG. 4A.

Figure 5:
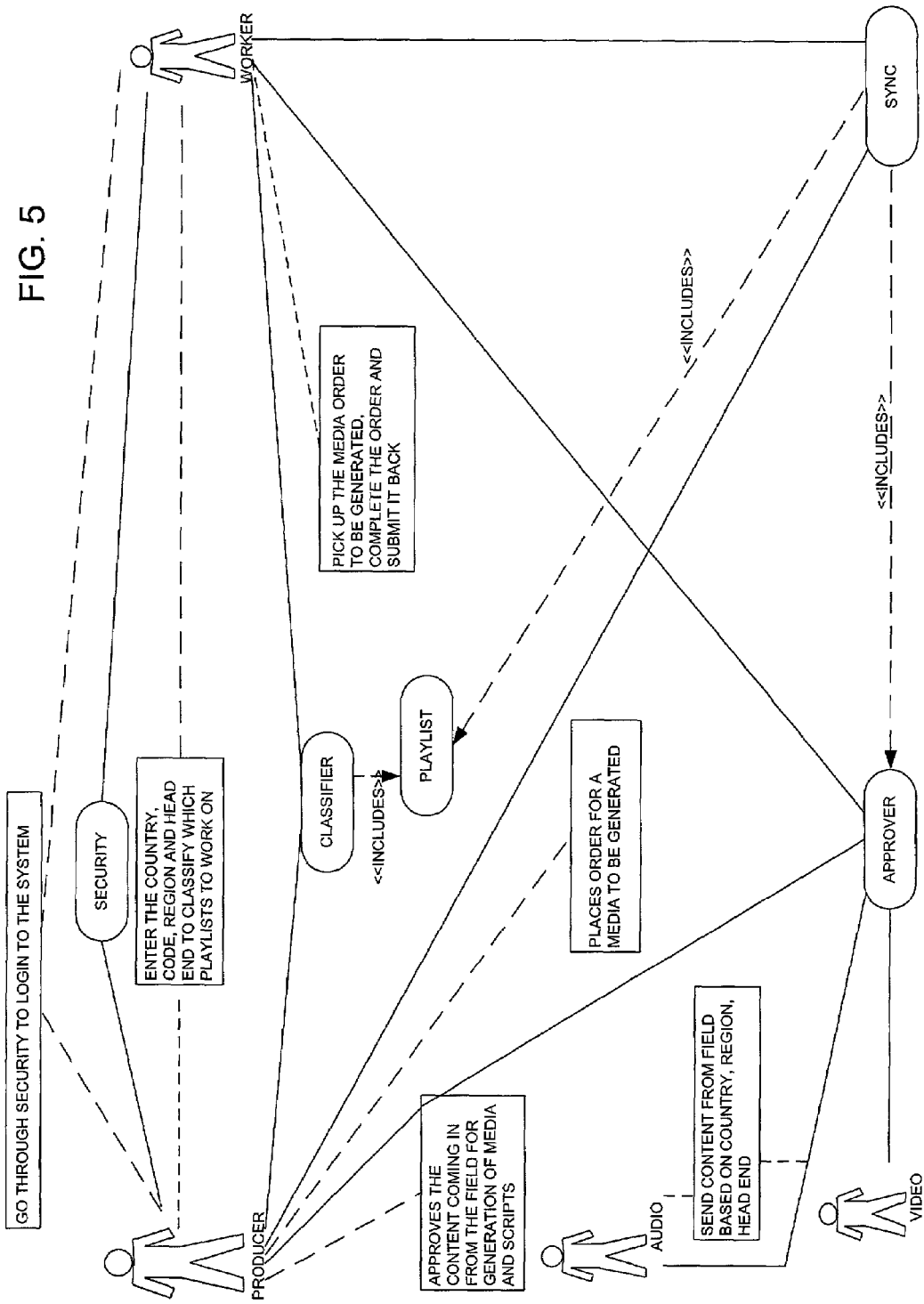
FIG. 5 is a use case diagram illustrating the relationship of the security, classifier, playlist and synchronization applications according to an embodiment of the present invention.

The present invention allows classification of products, users, media objects and contributors. Classification can be used for customization, security and other purposes. FIG. 5 is a use case diagram corresponding to a classifier according to an embodiment of the present invention. The notation in FIG. 5 and FIG. 5B would be apparent to those skilled in the art. Using the entities defined in FIG. 5 and FIG. 5B, projects, media objects and participants can be classified according to a number of criteria. For example, media elements and participants such as producers, directors, graphic artist and/or end users can be classified by name, broadcast network, entertainment division, program title, time and/or version, program element or scene, graphics and any other project classification. Using the entities shown in FIGS. 5 and 5B, project, object and participant classifications can be created, activated, passivated, removed, loaded, and stored.

As mentioned above, the present invention allows for classifying users as well. Using the entities shown in FIG. 5B, for example, contributors or users of the system can be classified by company, division, occupation, title, location, job function, preferences, or any other user classification. In addition, contributors or users can be classified according to security levels. Security levels can be used to limit access to contributors or users on an individual or per-class basis. For example, contributors or users may be limited access to certain legacy systems based on job title or company. In addition, security levels can be used to limit distribution access. For example, underage users would be denied access to adult programming. Further, security levels provide a mechanism for copy protection. For example, using secutiry levels copying permissions can be limited to only certain classes of users or no users at all. As with project classification, using the entities shown in FIG. 5B allows user classification to be created, activated, passivated, removed, loaded and stored.

Figure 5B:
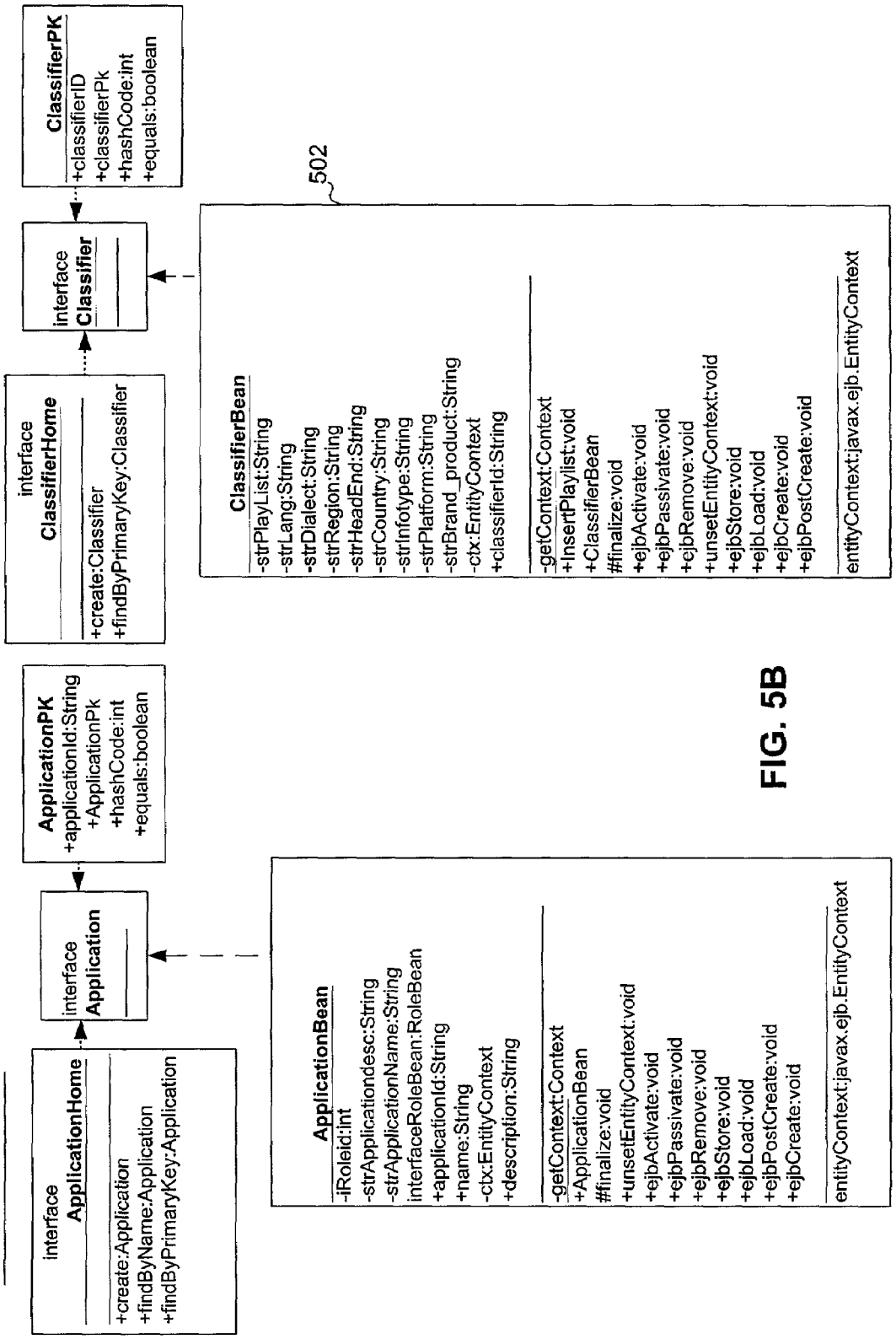
FIG. 5B is a diagram corresponding to the relationship of EJBs utilized in the classifier application

As FIG. 5B shows, classifications are created by creating a classifier bean 502 in Java. This classification bean includes classes for world, show, platform and brand in addition to other classifications. Any other desired classification can be included in the classifier bean. In addition, a playlist (described below) is associated with the classifier bean.

The present invention preferably operates in accordance with playlists that describe what tasks are required and who or what is to perform them with regard to the creation, management and distribution of "on-air" programs and/or experiences. For example, playlists can describe an actual program being processed, what products are being prepared and what distribution platforms need to be supported. In addition, playlists can be used to organize and assign tasks that need to be performed to create and distribute television elements and/or objects needed for broadcasts. Playlists can also be used with applications that implement schedules for sending program elements and/or objects to distribution devices.

Figure 6:
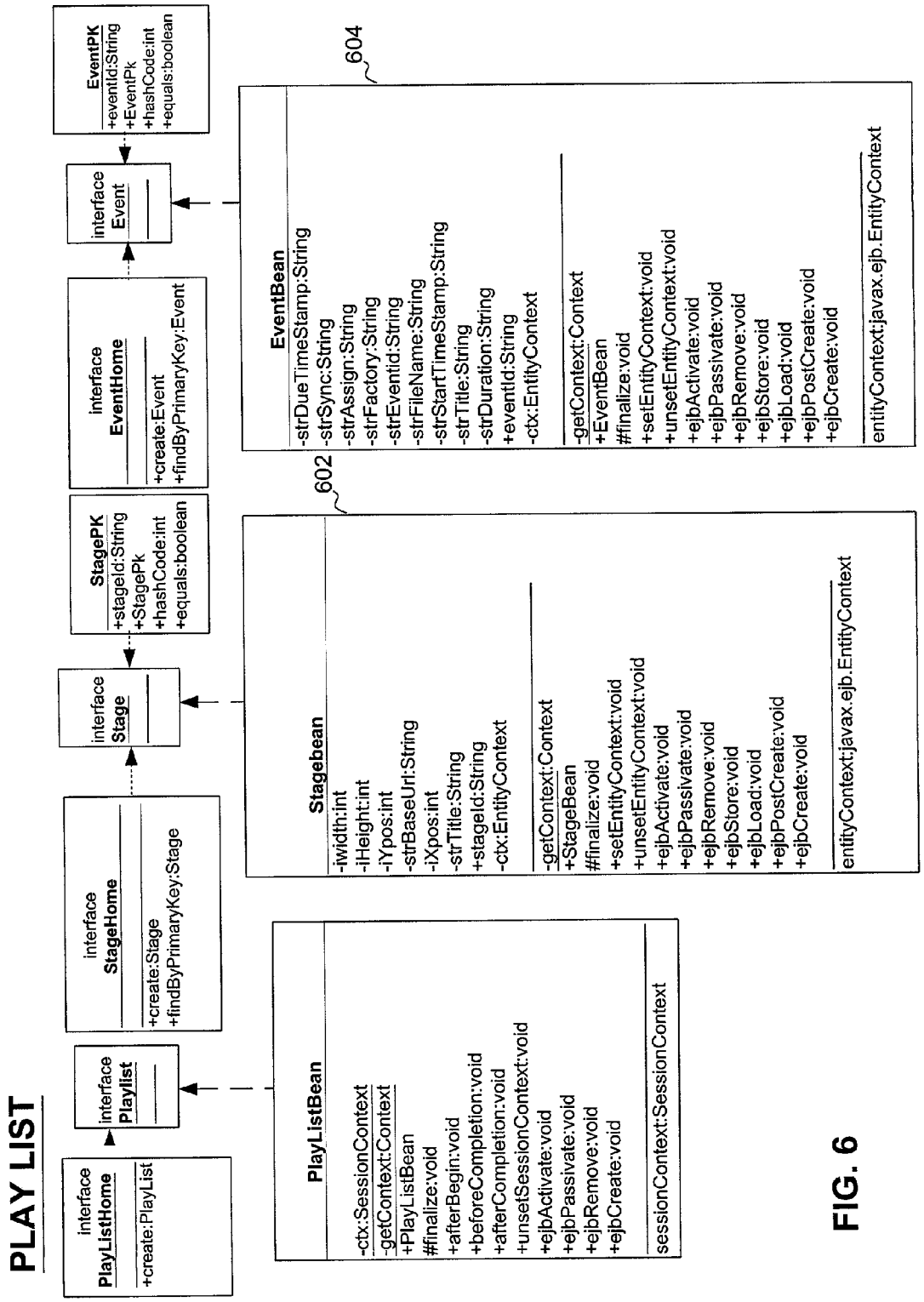
FIG. 6 is a use case diagram corresponding to the playlist managed approval and packaging of media objects and/or elements according to an embodiment of the present invention.

FIG. 6 is an entity relationship diagram corresponding to a playlist according to an embodiment of the present invention. Each playlist includes a stage bean 602. Stage bean 602 corresponds to an object. Objects represent all aspects of the television program and its creation. For example, objects include backgrounds, audio files, screen crawls, logos, windows for streaming video files, and any other object associated with creating or distributing the television program. Playlists also include actions to perform on objects. These actions include creating, activating, passivating, removing, storing and loading objects.

Each playlist also includes an event bean 604. Event bean 604 describes events. An event is a time specific activity such as the playback of a particular video object on a particular device at a specific time, which is synchronized with other objects that must playback at the same time on the same device. Event bean 604 includes event names, start times, durations, event IDs and any other desired information related to events. Event bean 604 also includes actions to perform on events. These actions include creating, activating, passivating, removing, storing and loading events.

Figure 7:
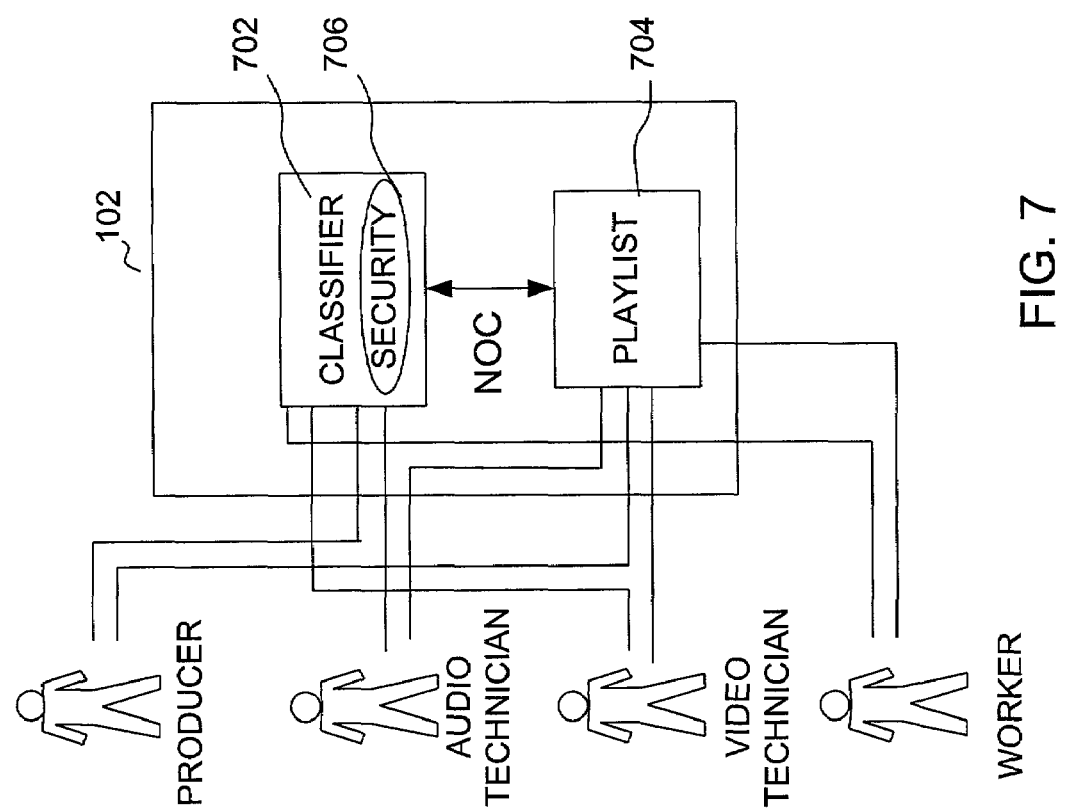
FIG. 7 is a schematic diagram illustrating the hybrid peer-to-peer collaborative environment as managed by the classifier and playlist functions of the present invention.

The present invention provides peer-to-peer collaboration. Using the present invention, peers can work simultaneously and remotely to create television programs more efficiently. FIG. 7 is a schematic diagram illustrating the peer-to-peer collaborative environment of the present invention. The collaborative peer-to-peer environment offered by the present invention functions as a virtual work environment that relieves co-workers from having to be co-located to work on a particular project. Classifier 702 describes what projects people work on, who is working on it and what security level they have. In addition, it determines if the transport of specific items is allowed to be sent over secure Intranets, encrypted Internet or unsecured public networks according to classifier determined security profiles for groups and/or individuals.

For example, in FIG. 7, a producer directs people and resources to work on his show. The producer can create a playlist 704 that describes what resources, objects and tasks are required, who should work on them and when the tasks are required. The producer can also just set forth what tasks are required. Workers and technicians can access the system and see if any tasks requiring their services are scheduled.

Workers and technicians generally access or are directed to playlist 704. Any tasks they need to complete are provided therein. Alternatively, when a worker or technician logs into the system, and has a task in the playlist, playlist 704 sends the worker or technician a message advising the worker or technician of the task.

In general, each person (producer, worker, technician, and other personnel) logs into the system. Preferably, login is controlled by a classifier 702 because it provides security 706 and access-protection based on personal identification or class. The producer can then enter various information related to television programming, including country, region, headend and which playlists to work on.

The playlists generally assign technicians and workers to complete tasks. For example, a producer can place a media order. The media order is processed by a worker. In addition, the producer can request content from the filed data storage be obtained whether central located or on a participant device. Audio and video technicians can obtain that content and send it back to the producer through NOC 102. The producer can approve the content or reject it and request alternate content. Thus, the present invention provides for management and control of all aspects of television broadcasting. Producers, workers, technicians and other personnel work in a collaborative environment in a seamless manner to create and distribute television program elements over diverse communication media.

Another important aspect of the present invention is synchronization. Synchronization is accomplished because playlists control assignment and completion of tasks. Thus, for example, producers can request that certain tasks be completed by a certain date and time. If the task is not completed NOC 102 notifies the producer or requester who can then take appropriate corrective action. In addition, tasks can be delayed until an event, such as completion of a prior task, occurs. Moreover, the playlist can be configured so that different media are played at the same time. For example, audio can be synchronized to a corresponding video file. In other words, the system is capable of determining what group of elements are destined for a variety of distribution scenarios and/or must be produced by what time to allow for approval, packaging, delivery and/or playback in order to provide the desired experience such as the "bumper" or lead in to a particular show.

Figure 8B:
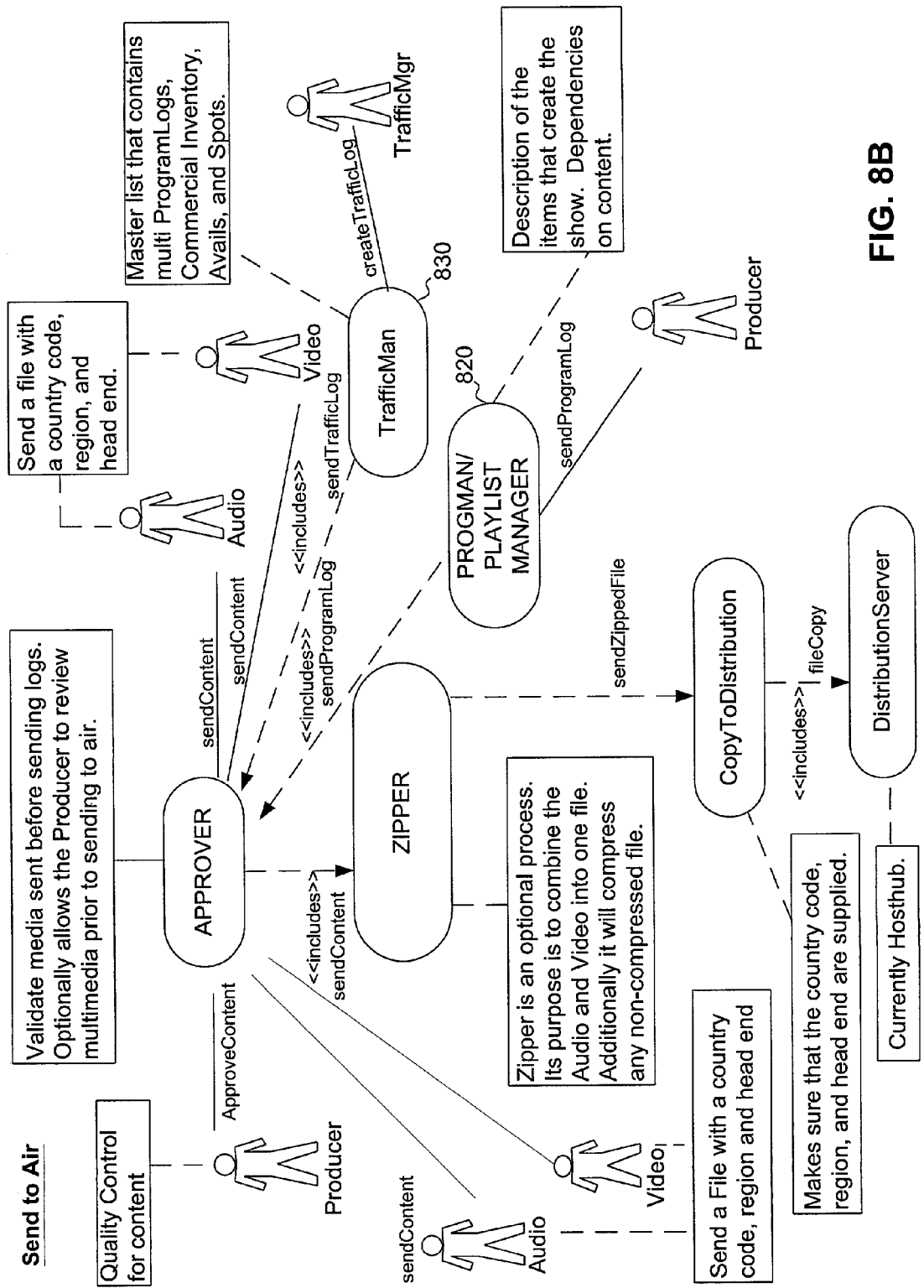
FIG. 8 is a schematic diagram for showing the approval process of a television program elements and/or objects according to an embodiment of the present invention.

FIGS. 8 and 8B are schematic diagrams for showing the approval process for elements of a television program according to an embodiment of the invention. Workers, technicians and other personnel submit content as required by a playlist to a producer or other approving authority 820. In addition, producer or other approving authority 820 receives program lists having program logs, commercial inventory, spots and other objects 830. Because there can be a large number of objects 830 in the system, a playlist manager process 804, executing on NOC 102, filters the playlist data to display only the data a particular user must see.

In addition, the producer or other approving authority is given information related to all of the objects that make up the television by a program manager process 802. Program manager process 802 organizes the objects for presentation to the producer or other approving authority. In addition, program manager process 802 describes any dependencies or content. For example, if a certain audio product must be played with a particular video product, that is included in the program manager process 802 information provided to the producer or other approving authority.

The producer or other approving authority reviews the information being provided and approves or rejects the information. The approval process waits for all required elements to be approved. At this point, the objects are compressed by a zipper 806. Zipper 806 "zips" (compresses) the objects for sending to a distribution manager 808. Distribution manager 808 sends the information to a distribution server 810. Distribution manager 808 works with distribution server 810 to assure that all objects have been sent. Once the all the elements for a particular television experience (i.e., a "bumper" or lead in) are sent, distribution server 810 plays the television experience to the various user devices as defined in the playlist. In this case, a TV program will consist of many much smaller TV experiences. In other words, a TV experiences is a full screen presentation of generally very short duration (a few seconds) that is composed of numerous TV objects that rely upon each other in order to construct a singular, coherent full screen image with sound.

Another aspect of the present invention is billing. Because, NOC 102 is centralized, billing is facilitated. Billing can be on any basis. For example, a user or contributor can be billed for the time the user or contributor is logged into the system. Another billing methodology is a charge per time, for example, a monthly fee. Bills can be generated by NOC 102 and automatically sent to the billed party. Another billing method is to charge a per use fee. Any other billing method can be used.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A scalable, profile-driven system for creating, managing and distributing media objects for the presentation of synchronous broadcast and/or interactive television programming, comprising:

a network operations center comprising a fault-tolerant, clusterable multi-processor hardware platform running a UNIX type operating system with a "best of breed" database and middleware executing thereon to communicate with one or more legacy systems that provide television programming production, management and distribution functionality;

an open standards, IP-based interface to the network operations center to provide access for one or more contributors to the television programming functionality of the legacy systems for the purpose of creating, managing and distributing television programming; and one or more media delivery devices that receive the television programming directly or indirectly, and synchronously display television programming to one or more users through one or many delivery platforms and/or devices in a broadcast or interactive fashion; and one or more edge servers and one or more JAVA-based player devices to integrate wireless QOS for the distribution of rich media.

2. The system recited in claim 1, wherein the network operations center provides a J2EE-based implementation.

3. The system recited in claim 1, further comprising an object-oriented playlist according to which the television programming is created, managed, secured and distributed.

4. The system recited in claim 3, wherein the television programming comprises objects whose creation, management, rights management and distribution is synchronized for playback across one or many reception devices.

5. The system recited in claim 1, wherein at least a portion of the television programming is customized for a one of the one or more users.

6. The system recited in claim 1, further comprising a classifier process to identify all participants and users.

7. The system recited in claim 1, further comprising one or more edge servers and one or more JAVA-based player devices to distribute both legacy and future TV programs.

8. The system recited in claim 1, comprising one or more edge servers and one or more JAVA-based player devices to distribute both real-time, streaming and non-real-time, store and forward program elements.

9. The system recited in claim 1, further comprising means for integrating legacy TV systems into a unified system capable of creating, managing and simultaneously distributing profile-driven, multi-distribution platform TV products.

10. The system recited in claim 1, further comprising means for integrating collaboratory and hybrid, peer-to-peer means in the creation, management, copy protection and distribution of TV objects and/or programming.

* * * * *